(12) United States Patent
Dascanio

(10) Patent No.: US 9,500,460 B2
(45) Date of Patent: Nov. 22, 2016

(54) POSITIONING APPARATUS AND METHOD FOR DISTANCE MEASUREMENT

(71) Applicant: Gustavo A. Dascanio, Solvang, CA (US)

(72) Inventor: Gustavo A. Dascanio, Solvang, CA (US)

(*) Notice: Subject to any disclaimer, the term of this patent is extended or adjusted under 35 U.S.C. 154(b) by 0 days.

(21) Appl. No.: 14/864,552

(22) Filed: Sep. 24, 2015

(65) Prior Publication Data

US 2016/0010969 A1    Jan. 14, 2016

Related U.S. Application Data

(63) Continuation of application No. 13/946,957, filed on Jul. 19, 2013, now Pat. No. 9,194,695.

(51) Int. Cl.

| | |
|---|---|
| *G01B 11/14* | (2006.01) |
| *G01B 3/10* | (2006.01) |
| *A63B 59/00* | (2015.01) |
| *G01B 21/04* | (2006.01) |
| *G01B 21/16* | (2006.01) |
| *G01B 5/00* | (2006.01) |
| *A63B 67/06* | (2006.01) |
| *G01B 5/14* | (2006.01) |
| *G01C 3/02* | (2006.01) |

(52) U.S. Cl.
CPC ............ *G01B 3/1071* (2013.01); *A63B 59/00* (2013.01); *A63B 67/068* (2013.01); *G01B 3/1084* (2013.01); *G01B 5/0023* (2013.01); *G01B 5/14* (2013.01); *G01B 11/14* (2013.01); *G01B 21/047* (2013.01); *G01B 21/16* (2013.01); *G01C 3/02* (2013.01); *G01B 2003/1074* (2013.01)

(58) Field of Classification Search
CPC .. G01B 11/14; G01B 3/1071; G01B 5/0023; G01B 21/047; G01B 21/16; A63B 59/00; A63B 67/068
USPC ........................................................ 356/614
See application file for complete search history.

(56) References Cited

U.S. PATENT DOCUMENTS

| | | | | |
|---|---|---|---|---|
| 4,333,237 | A * | 6/1982 | Carbone ............. | A63B 67/068 33/289 |
| 5,427,383 | A * | 6/1995 | Viens ................. | A63B 67/068 33/759 |
| 2005/0280803 | A1* | 12/2005 | Slesinski .............. | G01J 1/58 356/121 |

FOREIGN PATENT DOCUMENTS

AU        2013201839 A1 *  10/2013

* cited by examiner

*Primary Examiner* — Kara E Geisel
*Assistant Examiner* — Hina F Ayub
(74) *Attorney, Agent, or Firm* — Felix L. Fischer

(57) ABSTRACT

A ball distance measuring system incorporates a support received over a reference ball. A reference on the support has a diameter differing from a diameter of the reference ball by a predetermined amount visually distinguishable from a circumference of the reference ball presenting an even visual separation confirming concentric coincidence when centered with respect to the reference ball.

9 Claims, 16 Drawing Sheets

POSITIONING APPARATUS AND METHOD FOR DISTANCE MEASUREMENT

REFERENCE TO RELATED APPLICATIONS

This application is a continuation of application Ser. No. 13/946,957 having a filing date of Jul. 19, 2013, entitled POSITIONING APPARATUS AND METHOD FOR DISTANCE MEASUREMENT, the disclosure of which is incorporated herein by reference.

BACKGROUND INFORMATION

1. Field

Embodiments of the disclosure relate generally to the field of ball games and more particularly to embodiments for a measurement system incorporating a positioning device for centering over a reference ball with a measuring element attachment for distance measurement to competition balls.

2. Background

Games which employ a reference ball and competition balls thrown or rolled to rest as closely as possible to the reference ball are highly popular. Bocce, Petanque and lawn bowling all employ this basic premise. In many cases visually estimated measurement of the resulting spread of competition balls from the reference ball to determine the closest ball or balls may be difficult and as competition increases, the need for accurate measurement becomes very important. Of key concerns are obtaining accurate measurements without moving the reference ball during the measurements.

Measuring devices such as string, telescoping rods, measuring tape, and lasers are commonly used to determine positions of competition balls relative to the reference ball in order to award points. These methods require that one end of the measuring device be placed extremely close to the horizontal edge of the reference ball without touching the ball. It is not uncommon to accidentally move the reference ball thus invalidating subsequent measurements and creating a disputable situation.

Immediately after measuring a first competition ball, the measuring device must then be physically repositioned in order to measure a second competition ball. This repositioning further increases the risk of inadvertently contacting and moving the reference ball, and is time-consuming.

In order to avoid the problem of accidental contact with the reference ball, and to improve time efficiency, cylinders or cups have been utilized to provide a stable support for measuring devices. These supports are carefully placed over the reference ball and provide a rotational measuring point, the vertical axis of which is centered over the reference ball. This method allows rapid comparative sequential measurements using any of the aforementioned measuring devices without repositioning the reference point on the reference ball.

However, existing cylinder or cup positioning devices do not provide a means by which to accurately and precisely align the vertical measuring axis with the reference ball, and are subject to optical deficiencies and inaccuracy due to parallax errors or low visibility of the reference ball, which may create errors in measurement.

It is therefore desirable to provide a highly accurate device to locate the vertical axis of the reference ball without contacting or moving the reference ball. Additionally, it is desirable that such a device accommodate various measurement elements for high accuracy of measurement from the reference ball to competition balls.

SUMMARY

Exemplary embodiments provide a ball distance measuring system incorporating a support received over a reference ball. A reference on the support has a diameter differing from a diameter of the reference ball by a predetermined amount visually distinguishable from a circumference of the reference ball presenting an even visual separation confirming concentric coincidence when centered with respect to the reference ball.

In one embodiment the support includes a cylindrical tube supporting a first reference land and a hemispherical cap extending from the cylindrical tube. The hemispherical cap has a plurality of apertures through which the first reference land may be viewed.

In an alternative embodiment the support incorporates a plurality of legs and a first reference land supported by the plurality of legs.

The embodiments provide a method for measuring the distance of a competition ball from a reference ball by providing a reference ball cover and supporting a first reference for visually establishing concentric coincidence with the reference ball. A measurement support is attached to the reference ball cover. A measurement device on the measurement support is employed to measure distance to a desired competition ball.

The features, functions, and advantages that have been discussed can be achieved independently in various embodiments of the present invention or may be combined in yet other embodiments further details of which can be seen with reference to the following description and drawings

DETAILED DESCRIPTION

The embodiments described herein disclose a reference ball cover with highly visible relative centering reference elements for centering the cover over the reference ball by establishing concentric coincidence between the reference elements and the reference ball. A single or double centering reference may be employed with an open architecture to facilitate maximizing light on the reference ball for accurate viewing of the reference elements. A rotational pivot is provided centered on the cover to be collinear with a vertical axis of the resting reference ball for attachment of a measuring element. An adjustable base attachable to the pivot provides an accurate placement of the measurement device for measurement from the circumferential edge of the reference ball to competition balls even with the cover in place.

Figure 1:
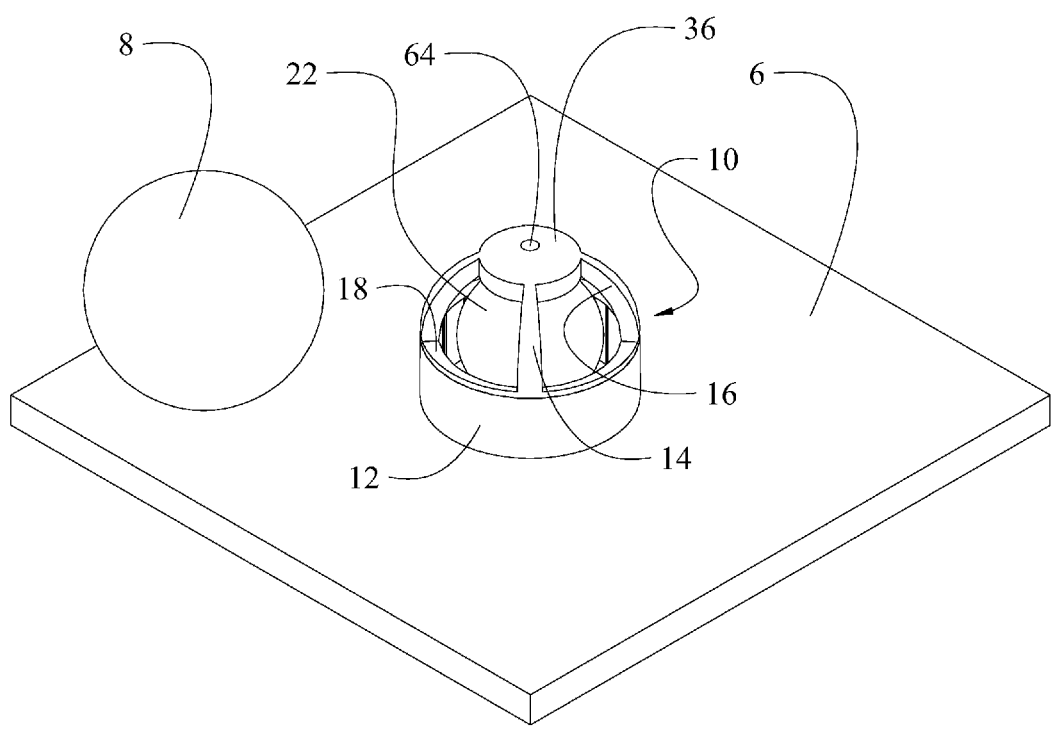
FIG. 1 is a pictorial view of a first embodiment of a reference ball cover over a reference ball on a playing surface with an example competition ball.
Figure 2:
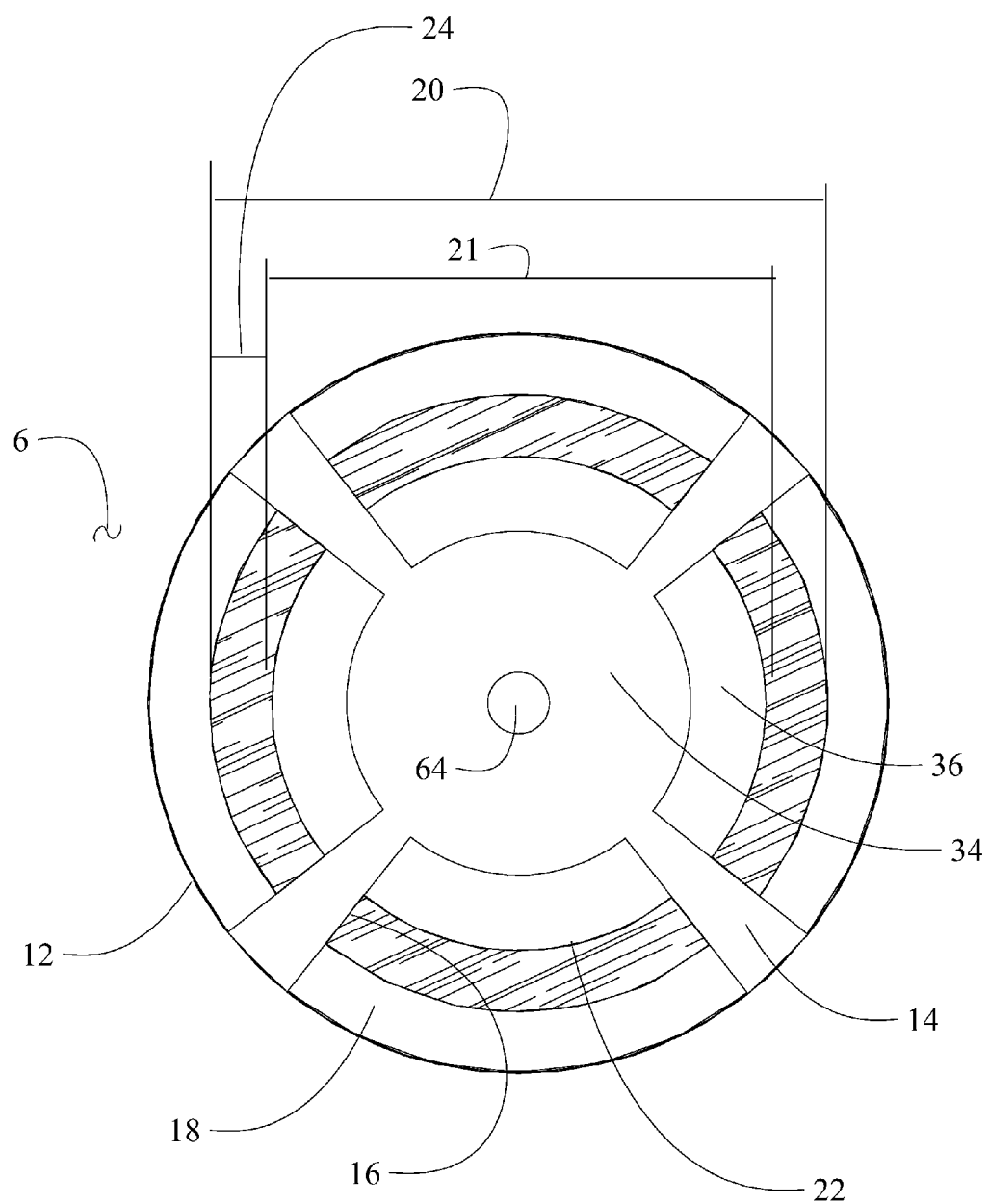
FIG. 2 is a top view of the embodiment of the reference ball cover.
Figure 3:
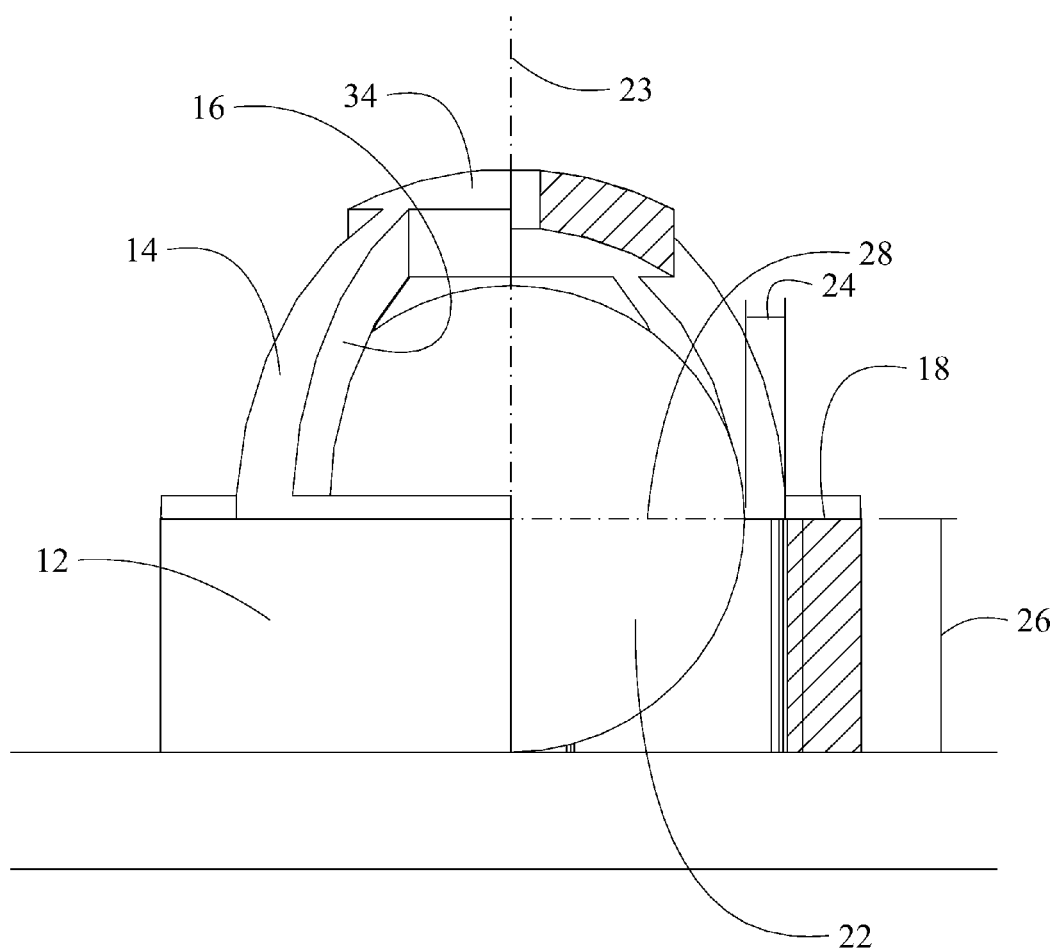
FIG. 3 is a side partial section view of the embodiment of the reference ball cover.

Referring to the drawings, FIG. 1 shows a first embodiment of a positioning apparatus. For a playing surface 6 on which competition balls 8 are rolled or thrown, the positioning device employs a reference ball cover 10 with a cylindrical base 12 as a support for a hemispherical cap 14. Cylindrical base 12 is formed in the exemplary embodiments from a cylindrical tube with desired thickness as will be described in greater detail subsequently. The hemispherical cap 14 incorporates windows or apertures 16 equally spaced about the circumference extending from the equator of the hemispherical cap. As seen in FIG. 2, the thickness of the cylindrical base 12 forms a first reference, reference land 18 for the embodiment shown, which is visible through the apertures 16. In alternative embodiments, a thin wall may be employed in the cylindrical base and a flange extended from the wall to create the reference land. The inner diameter 20 of the cylindrical base and mating inner diameter of the cap exceed the diameter 21, of a reference ball 22 over which the cover 10 is placed, by predetermined margin 24. The margin is large enough to avoid contact with the reference ball during placement of the positioning device, and small enough to allow accurate visual concentric alignment. As seen in FIG. 3, the height 26 for the cylindrical base and equator 28 of the hemispherical cap are substantially coplanar with an equator 30 of the reference ball 22. For the embodiment shown, the apertures 16 terminate at an upper extent at a latitude 32 on the hemispherical cap 14 which forms a reference dome 34 in the upper extent of the cap.

As seen in FIG. 2, the reference land 18 provides a visual cue for spacing of the reference ball 22 centrally in the land making the margin 24 equidistant around the equator of the reference ball, defined herein as concentric coincidence between the reference land and the reference ball. The human eye can very accurately determine the equidistant relationship of the reference land 18 from the circumferential edge of the reference ball for accurately positioning the cylindrical base 12 concentrically with a vertical axis 23 of the reference ball. The reference land 18 when viewed from above the reference ball cover provides a distinct visual ring either of the playing surface 6 or a dark region in margin 24 about the reference ball 22 to demonstrate concentric coincidence. Viewed color present in the margin 24 (shaded in FIG. 2 for clarity) will be dependent on whether the elements of the reference ball cover 10 are translucent allowing light to reach the playing surface 6 surrounding the reference ball or opaque providing a dark shadow in the margin.

With the embodiment shown, a secondary reference is established by the dome 34 which also provides a reference for equidistant spacing on the visible sector 36 of the reference ball 22. As with reference land 18, dome 34 when viewed from above the reference ball cover provides a distinct visual ring of visible sector 36 of the reference ball 22 for which the human eye can accurately detect an equidistant relationship of the edge of dome 34 and circumference of the reference ball 22 as a secondary indicator of concentric coincidence.

Placement of the reference land 18 coplanar with the equator of the reference preliminarily avoids parallax issues with sighting. By establishing a second complimentary equidistant spacing using the secondary reference of the dome 34 parallax error is substantially eliminated. The reference land 18 may be painted or the material of the cover chosen such that a clearly contrasting coloration is provided with the reference ball 22, the resulting coloration perceived in margin 24 due to visible playing surface 6 on which the ball rests (or the unlit shadow presented by the margin) and the reference land 18. The coloration of the dome 34 may be similarly contrasting with the color of the reference ball 22 to accommodate the second reference.

Figure 4:
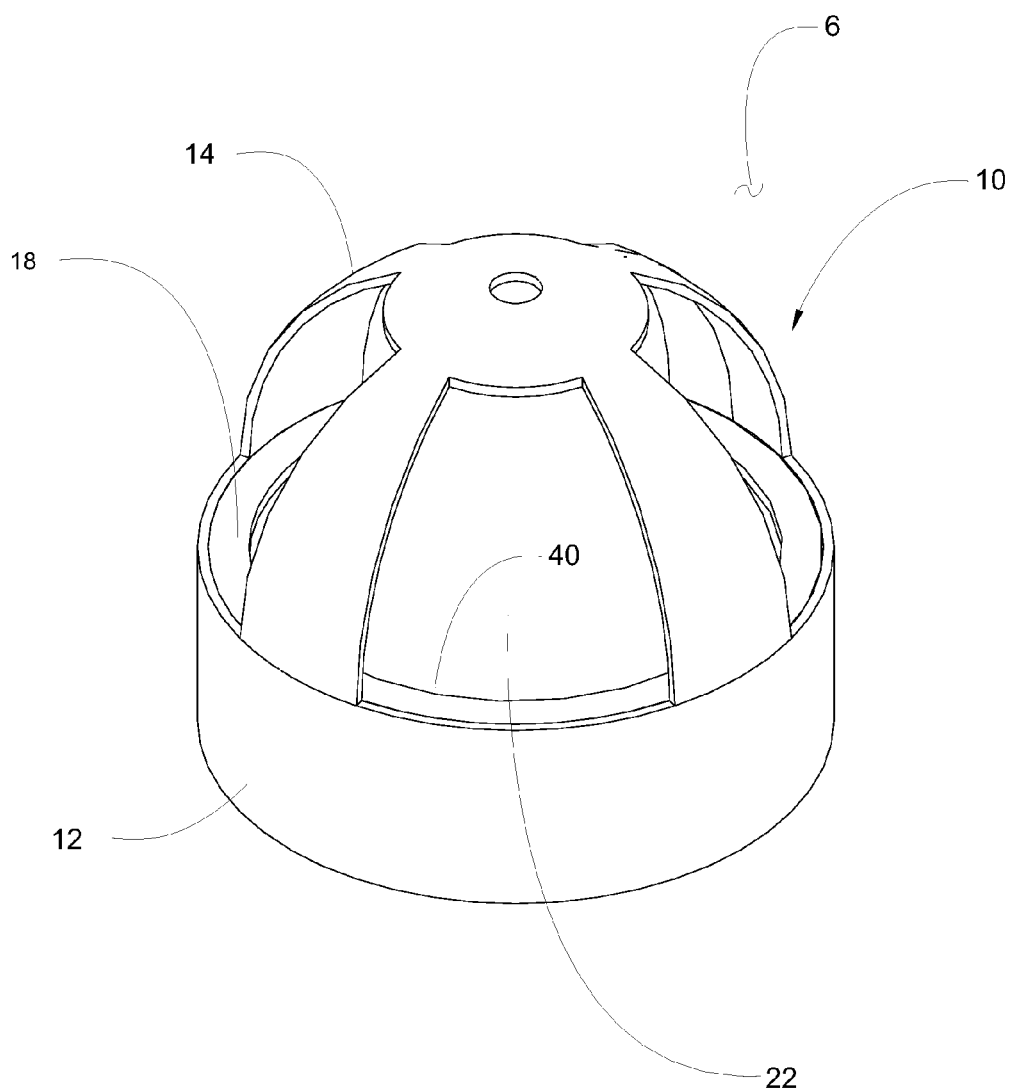
FIG. 4 is pictorial view of a second embodiment of the reference ball cover.
Figure 5:
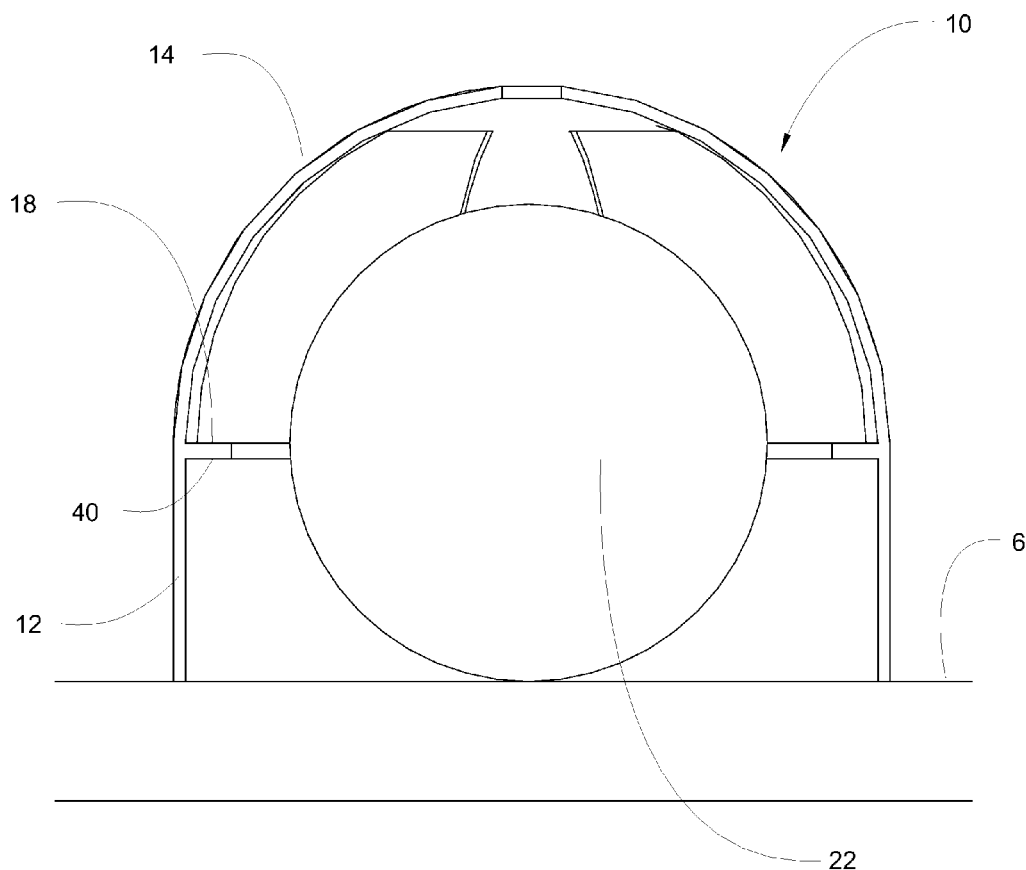
FIG. 5 is a side section view of the second embodiment of the reference ball cover with a thin wall and extending flange.

FIGS. 4 and 5 show a second embodiment of the cover 10 with a thin wall cylindrical tube with a flange 40 providing the reference land 18.

Figure 6:
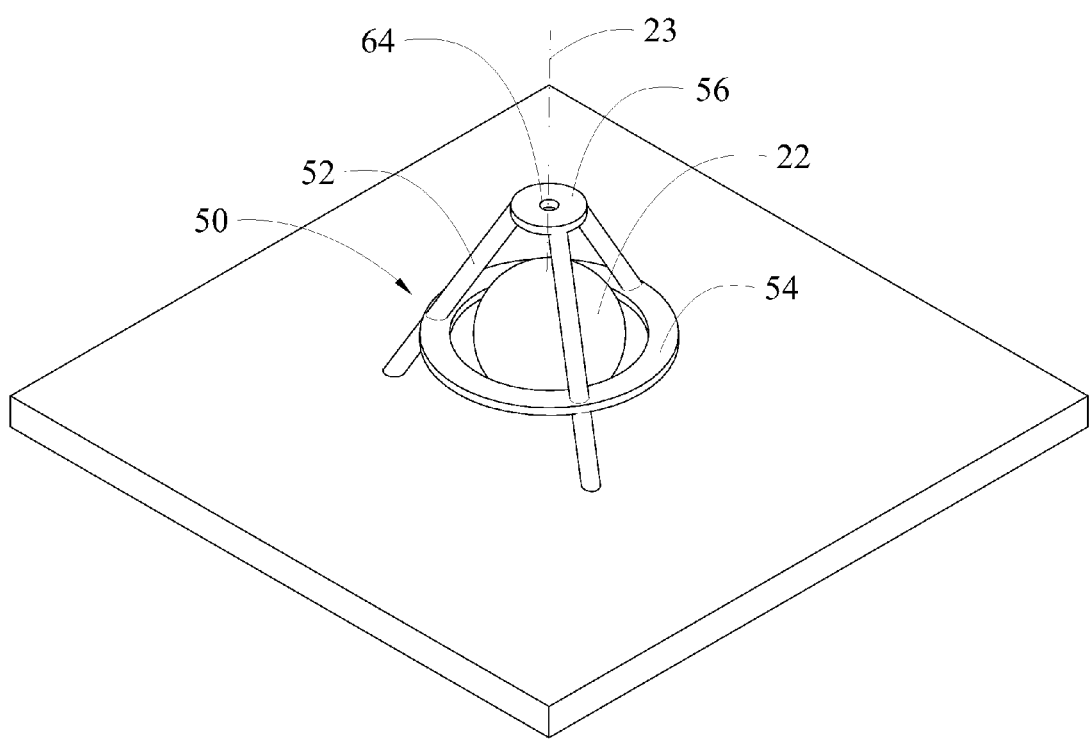
FIG. 6 is a pictorial view of an alternative exemplary embodiment of the reference ball cover.
Figure 7:
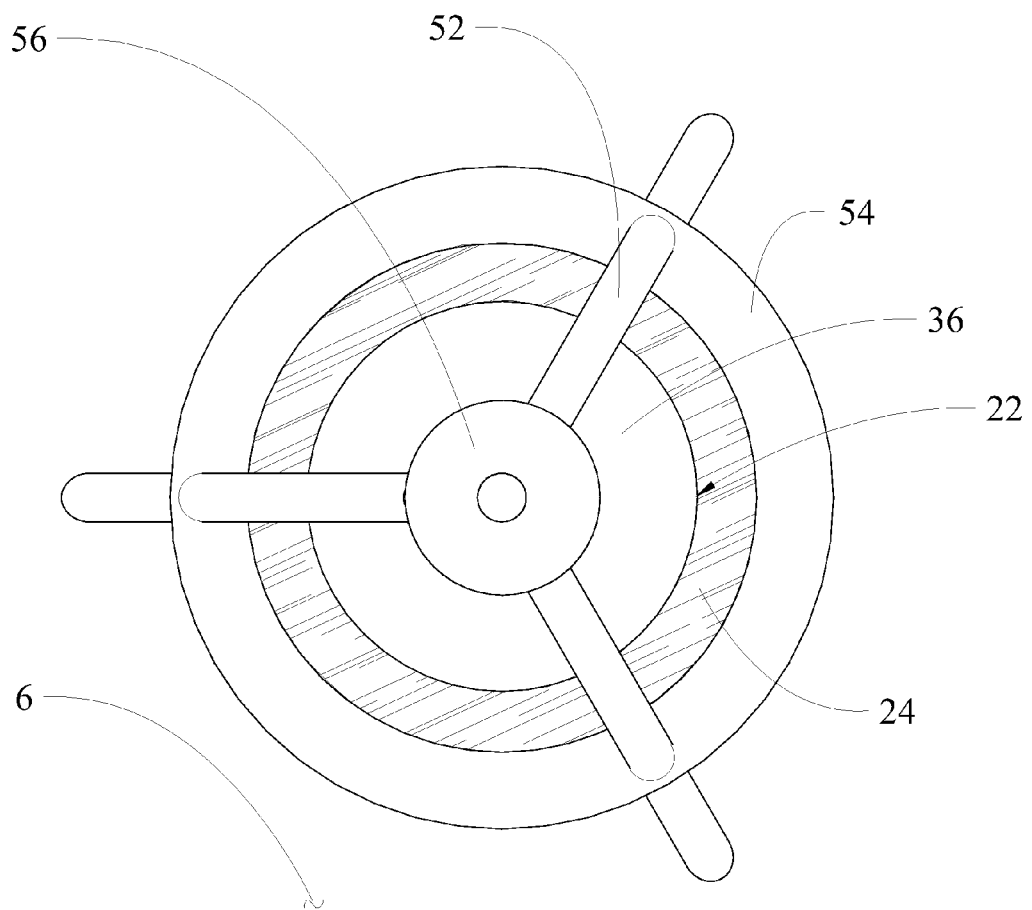
FIG. 7 is a top view of the embodiment of FIG. 6.
Figure 8:
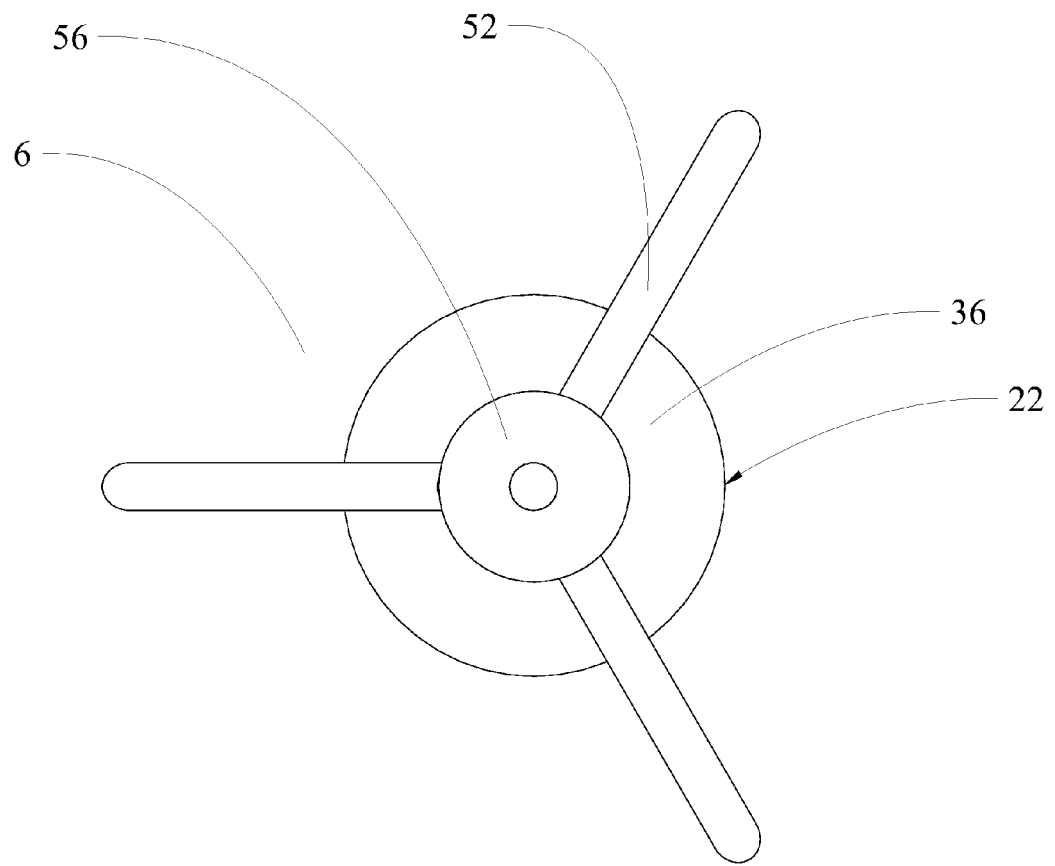
FIG. 8 is a top view of the embodiment of FIG. 6 with the equatorial reference land omitted.
Figure 9:
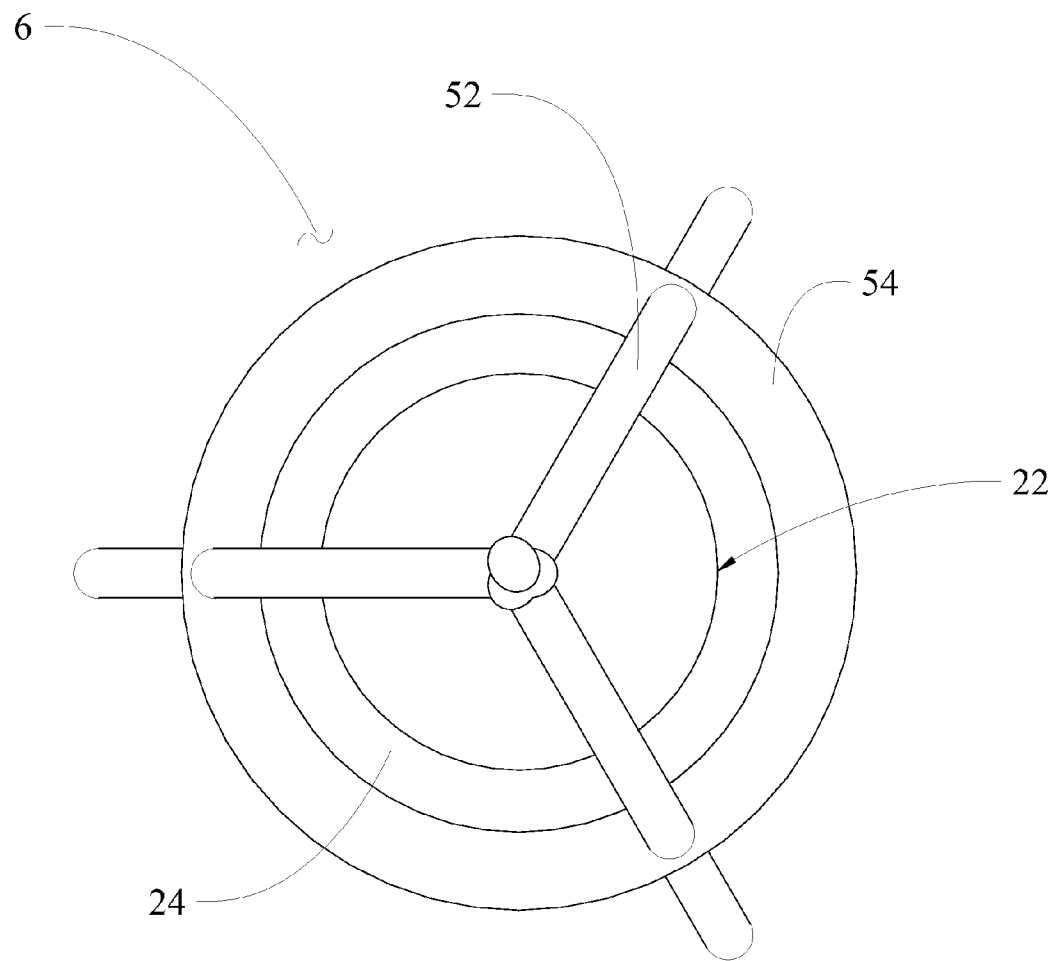
FIG. 9 is a top view of the embodiment of FIG. 6 with the second reference disk removed; and, FIG. 10A is a top view of alternative configurations of the first and second references.

An alternative embodiment of a reference ball cover 50 is shown in FIG. 6. Reference ball cover 50 employs support legs 51 in the form of a tripod 52 on which a reference land 54 is supported. The reference land 54 is supported to be coplanar with the equator 30 of reference ball 22. As previously described with respect to the first embodiment, the human eye can very accurately determine the equidistant relationship of the reference land 54 from the reference ball 22 establishing concentric coincidence for accurately positioning the rotational pivot 64 of the tripod 52 with the vertical axis 23 of the reference ball 22 as represented in FIG. 7 (with margin 24 shaded for reference). A secondary reference may also be established with the alternative embodiment by placement of a disk 56 at or near the upper extent of the tripod 52 which also provides a reference for equidistant spacing of the visible sector 36 of the reference ball 22 as shown in FIG. 7. By establishing a second equidistant spacing using the secondary reference of the disk 56 parallax error is substantially eliminated. While a tripod is shown for the embodiment, four or more legs supporting the reference land 54 and disk 56 may be employed. Additionally while the legs are shown as straight, angled legs may be employed for a closer fit around the reference ball 22. As with the prior embodiment, the reference land 54 and disk 56 may be painted or made of materials providing contrast with the colors of the reference ball 22 and perceived color in margin 24. In certain embodiments, the disk 56 may act as the sole reference element and the reference land 54 may be eliminated as shown in FIG. 8. Similarly, the disk 56 may be eliminated and the equatorial reference provided by reference land 54 solely used for positioning as shown in FIG. 9.

Figure 10A:
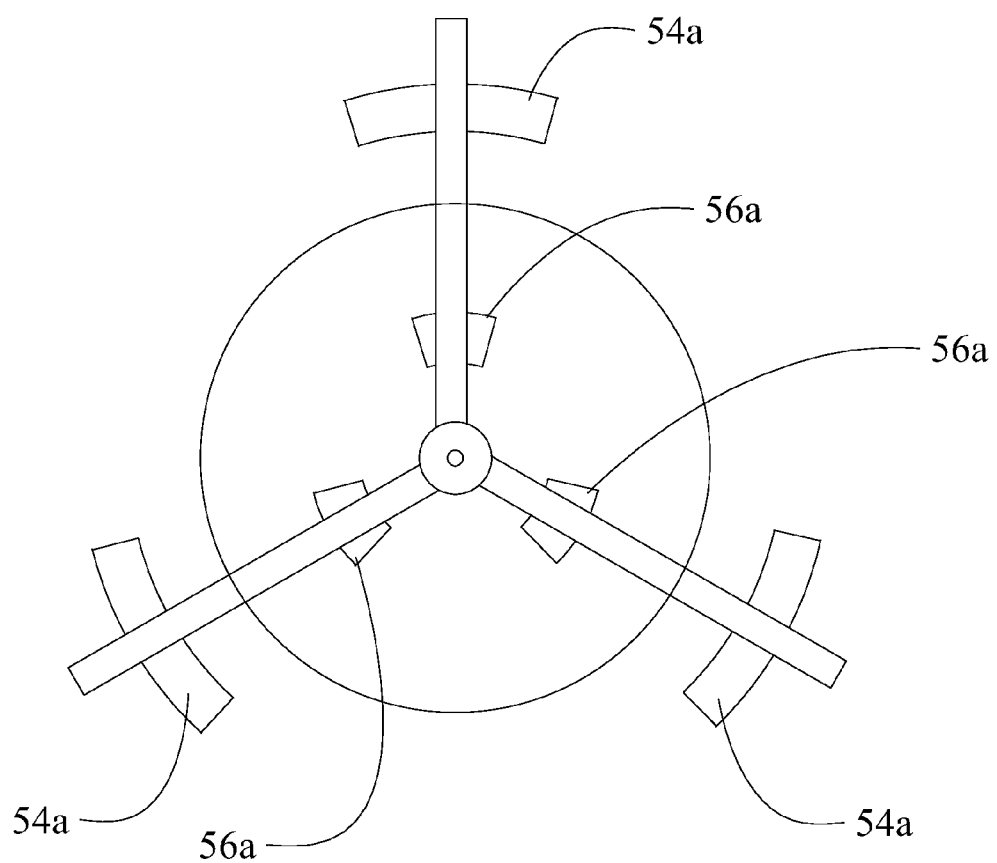
FIG. 10B is a top view of a second alternative for configurations of the first and second references.
Figure 10B:
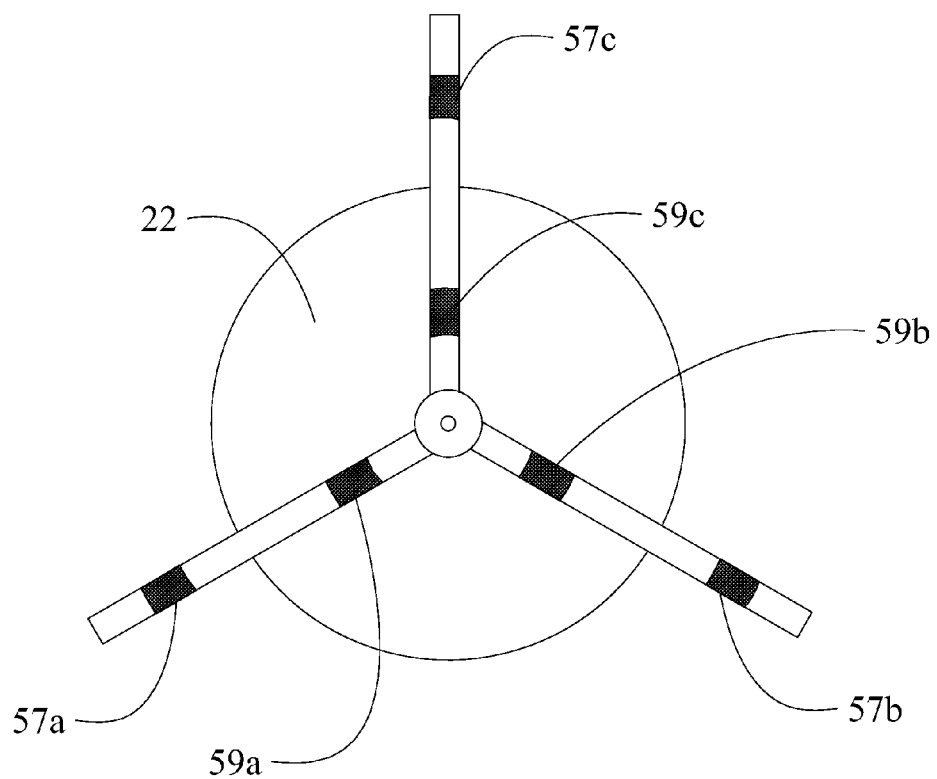

While the described exemplary embodiments are continuously circular, the first reference and second reference may be segmented circular elements or points of any geometric shape positioned around the circumference of the reference ball. As shown in FIG. 10A for an exemplary three element display, the first reference is formed by indices 54a and the second reference is formed by indices 56a. Three or more indices replacing one or both of the first or second reference provides the desired visual reference for centering of the reference ball cover over the reference ball. In a second alternative shown in FIG. 10B, the reference indices 57*a*, 57*b* and 57*c* and 59*a*, 59*b* and 59*c* may be colored bands or clear windows on the support legs 51 of tripod 52 to create the distinction in coloration perceived by the user to center the support over the reference ball.

Figure 11:
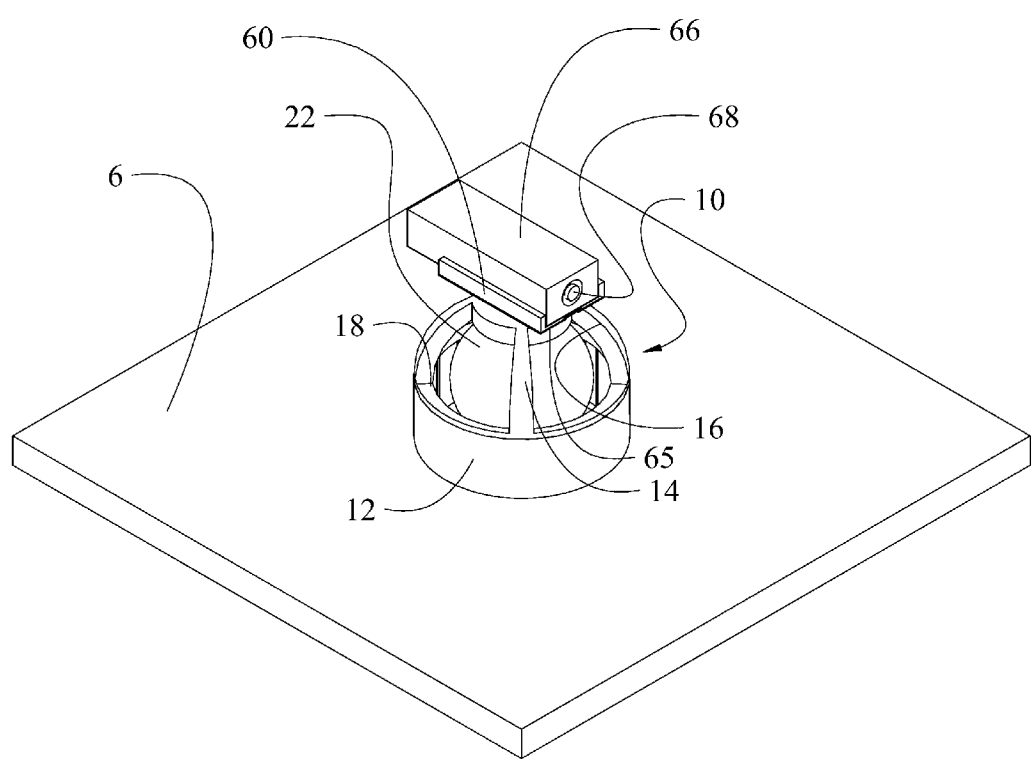
FIG. 11 is a pictorial view of a distance measurement support platform installation on the embodiment of FIG. 6.
Figure 12:
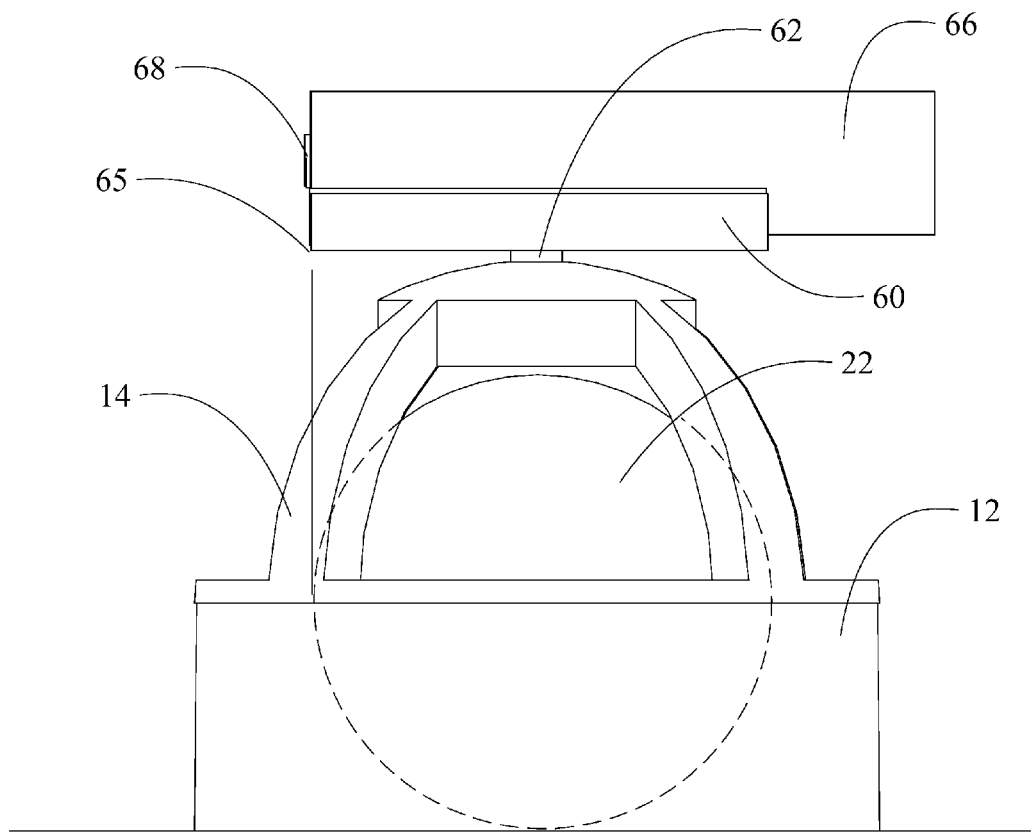
FIG. 12 is a side sectional view of the support platform of FIG. 10.
Figure 13:
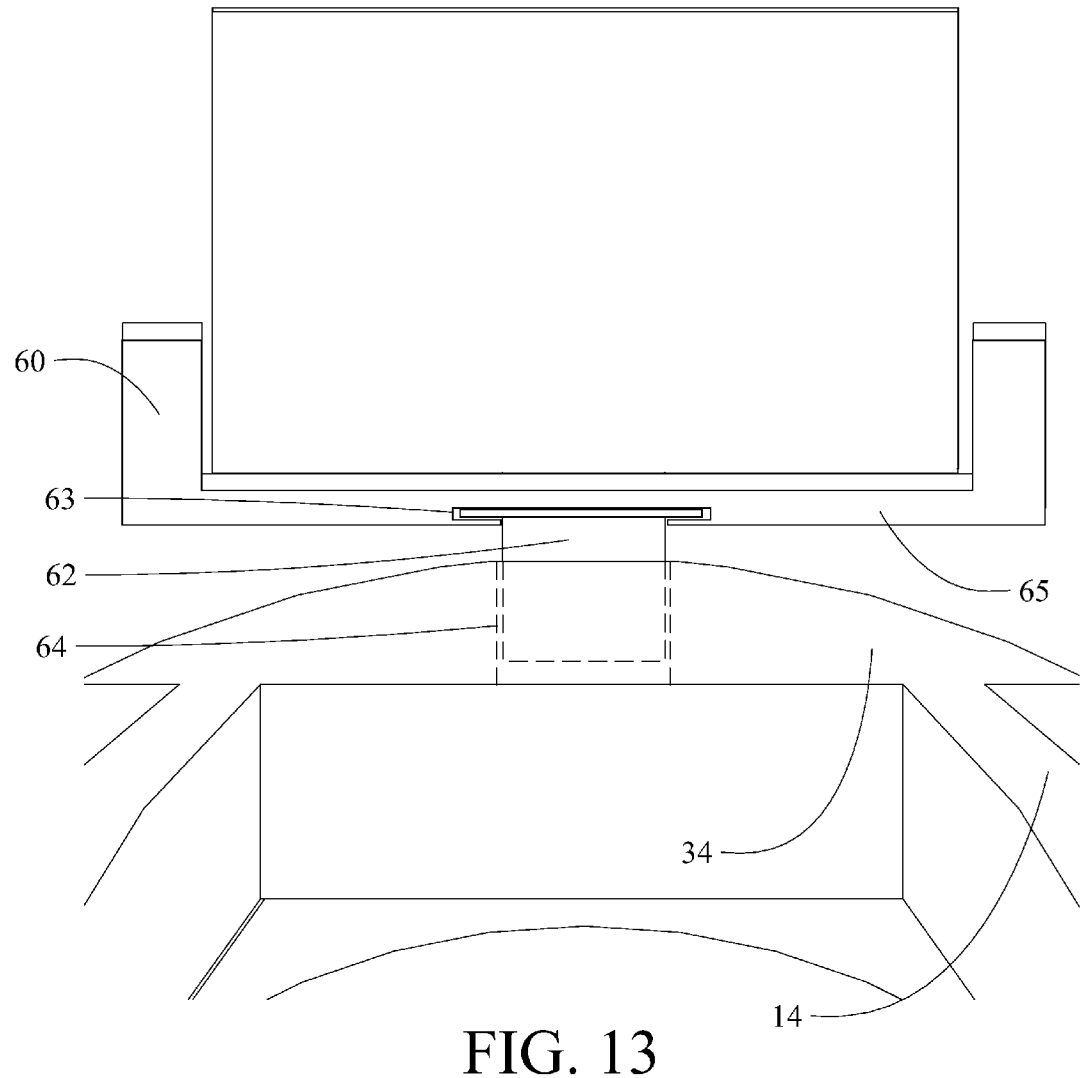
FIG. 13 is a detailed sectional view of an adjustment mechanism for the measurement edge of the support platform.

With the reference ball cover accurately in place over the reference ball, measurement of distance to competition balls may be accomplished with several measurement devices. As show in FIGS. 11 and 12 for the first embodiment, a support platform 60 is provided with a pin 62 to be received in a central bore 64 in the hemispherical cap 14 (as seen in FIG. 2). For the embodiment shown, central bore 64 will be aligned with the vertical axis 23 of the reference ball 22. Measurement of distance from the reference ball to the competition balls may be made from any common vertical reference and thereby provide an equivalent measurement to each competition ball. Depending on the actual measurement rules of any particular game, platform 60 may be adjustable with respect to the pin 62 for accurate placement of a reference edge 65 vertically aligned with the circumferential edge of the reference ball 22. For example, pin 62 may be slidably retained in a slot 63 in the platform 60, as shown in FIG. 13. The engagement of pin 62 in central bore 64 allows 360° rotation of the support platform for alignment of the measuring device with a competition ball at any angle relative to the reference ball. A laser range finder 66 as an exemplary measurement device may then be placed on or affixed to or integrated with the platform 60 with the laser aperture 68 aligned with the reference edge 65. In this manner, accurate measurement pursuant to the rules from the edge of the reference ball's circumference to a competition ball may be made. Alternatively, the laser range finder may be internally adjustable (through software or other means as known in the art) to automatically compensate for aperture offset to correct the measured distance from the vertical axis 23 of the reference ball 22.

Figure 14:
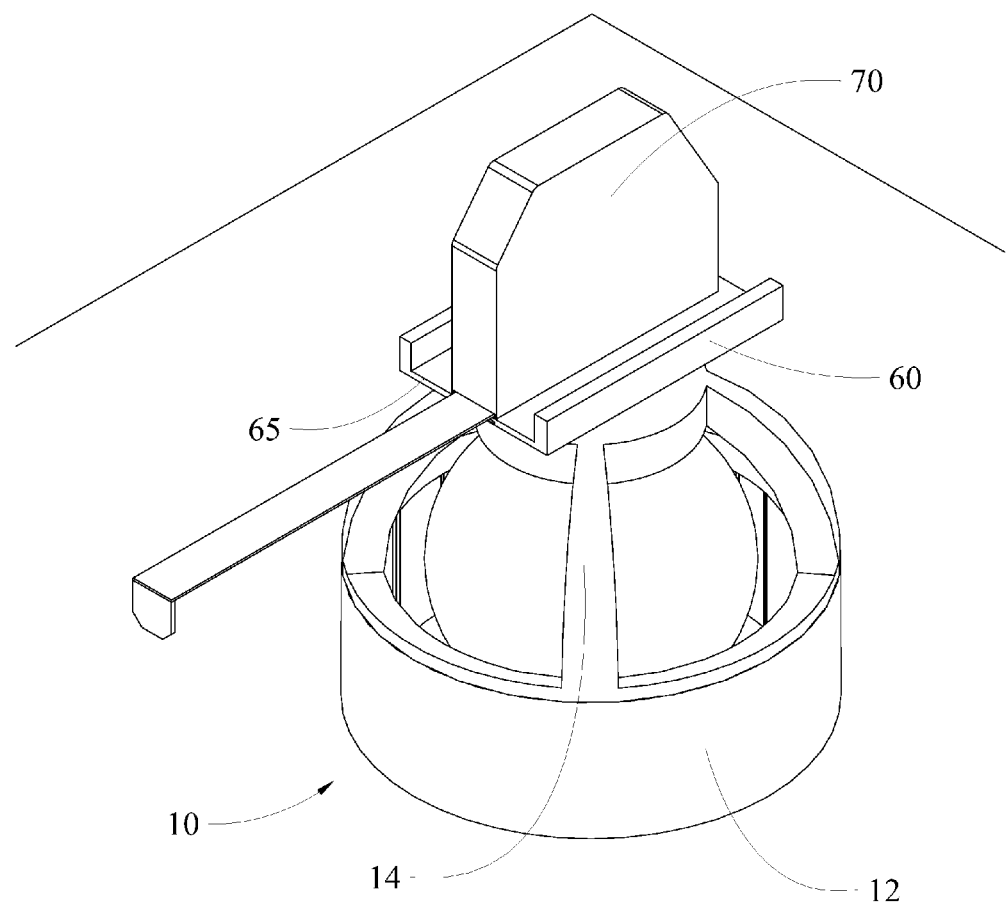
FIG. 14 is a side view of a tape measure attachment on the support platform as an alternative measurement device; and, FIG. 15 is a flow chart of a method for competition ball distance measurement from a reference ball employing the embodiments disclosed herein.

Alternatively, a measurement tape 70 may be place on or affixed to or integrated with platform 60 aligned with the reference edge 65 as shown in FIG. 14 to perform the measurement.

Figure 15:
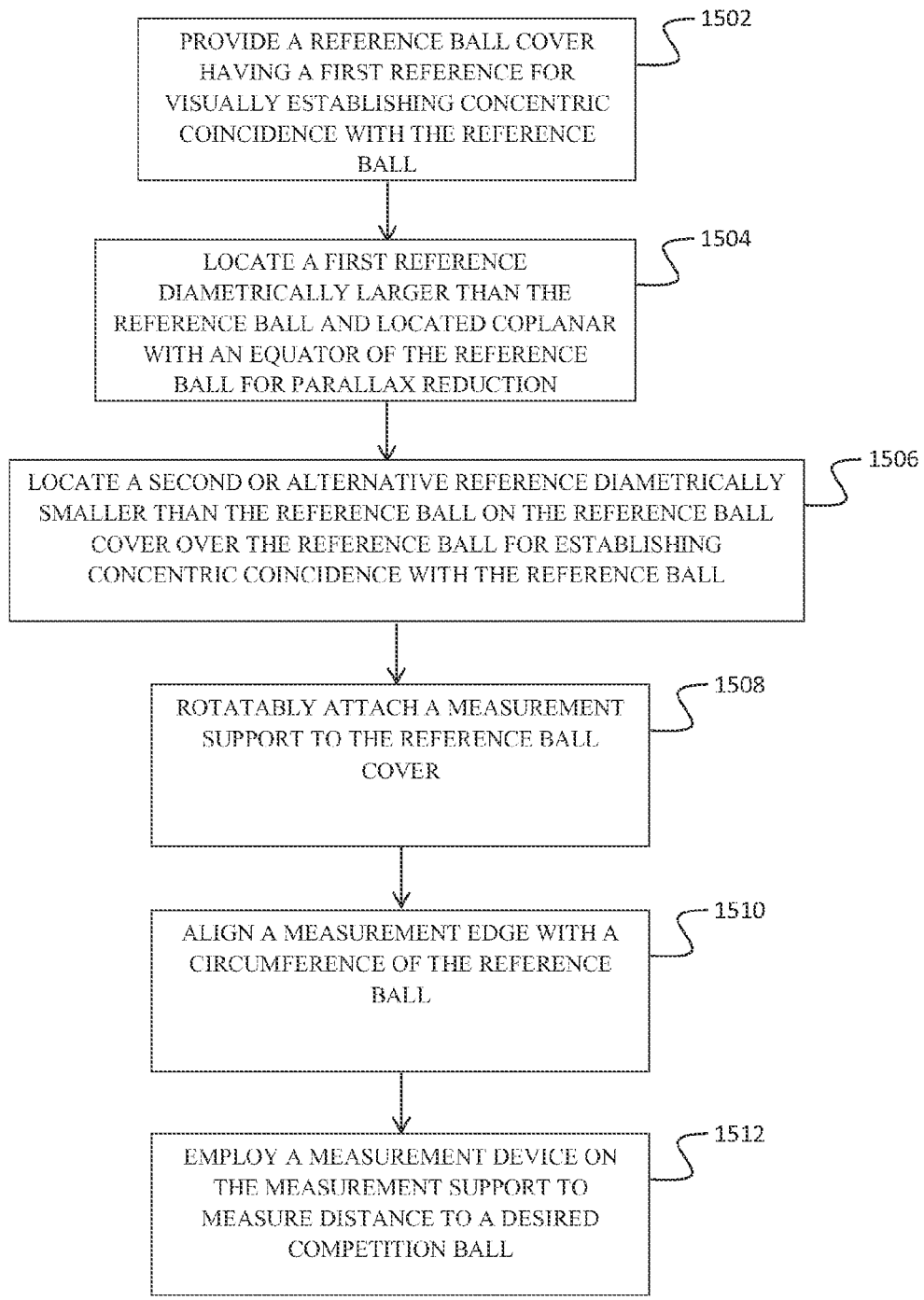

As shown in FIG. 15, measurement of distance of competition balls from a reference ball may be accomplished by providing a reference ball cover having a first reference for visually establishing concentric coincidence with the reference ball, step 1502. The first reference may be diametrically larger than the reference ball and located coplanar with an equator of the reference ball for parallax reduction, step 1504. A second or alternative reference diametrically smaller than the reference ball is located on the reference ball cover over the reference ball for establishing concentric coincidence with the reference ball, step 1506. A measurement support is rotatably attached to the reference ball cover, step 1508 and a measurement edge aligned with a circumference of the reference ball, step 1510. A measurement device on the measurement support is then employed to measure distance to a desired competition ball, step 1512.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A ball distance measuring system comprising:
a plurality of legs; and
a first reference land supported by the plurality of legs, said first reference land supported to be coplanar with an equator of a reference ball and visible from a vertical axis from the reference ball, the first reference land having a diameter larger than a diameter of the reference ball by a margin to be visually distinguishable from a circumference of the reference ball with contrasting coloration presenting an even visual separation confirming concentric coincidence when centered with respect to the reference ball.

2. The ball distance measuring system as defined in claim 1 further comprising a disk mounted at an upper extent of the legs as a second reference.

3. The ball distance measuring system as defined in claim 2 wherein the disk incorporates a bore and further comprising:
a support platform having a pin rotatably received in the bore.

4. The ball distance measuring system as defined in claim 3 wherein the support platform is adjustable with respect to the pin for alignment of a reference edge with a circumference of the reference ball.

5. The ball distance measuring system as defined in claim 4 further comprising a distance measurement device supported by the support platform.

6. The ball distance measuring system as defined in claim 5 wherein the distance measurement device comprises a laser range finder with a laser aperture aligned with the reference edge.

7. The ball distance measuring system as defined in claim 5 wherein the distance measurement device comprises a tape measure with a tape aperture aligned with the reference edge.

8. A method for measuring of ball distance comprising:
providing a plurality of interconnected legs having a first reference land supported by the plurality of legs at an equator of a reference ball and having a diameter differing from and larger than a diameter of the reference ball by a margin;
distinguishing visually a circumference of the reference ball with respect to contrasting coloration on the first reference land to present an even visual separation of the margin confirming concentric coincidence when the plurality of legs are centered with respect to the reference ball;
rotatably attaching a measurement support to an upper extent of the interconnected legs; and,
employing a measurement device on the measurement support to measure distance to a desired competition ball.

9. The method as defined in claim 8 wherein the step of providing a plurality of interconnected legs further comprises:
providing a second reference mounted proximate the upper extent of the plurality of interconnected legs, said second reference having a diameter differing from and smaller than the diameter of the reference ball; and
the step of distinguishing visually a circumference additionally includes distinguishing contrasting coloration on the second reference to present an even visual separation confirming a second concentric coincidence when the plurality of legs are centered with respect to the reference ball.

* * * * *